United States Patent
Kowarz et al.

(12)
(10) Patent No.: US 6,335,831 B2
(45) Date of Patent: *Jan. 1, 2002

(54) MULTILEVEL MECHANICAL GRATING DEVICE

(75) Inventors: Marek W. Kowarz; Brian E. Kruschwitz, both of Rochester, NY (US)

(73) Assignee: Eastman Kodak Company, Rochester, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/216,375

(22) Filed: Dec. 18, 1998

(51) Int. Cl.$^7$ .......................... G02B 5/18; G02B 26/08; G02B 26/00
(52) U.S. Cl. ................ 359/573; 359/224; 359/291
(58) Field of Search ................ 359/224, 572, 359/573, 291, 223, 295, 575, 566

(56) References Cited

U.S. PATENT DOCUMENTS

| | | | |
|---|---|---|---|
| 4,011,009 A | 3/1977 | Lama et al. ............ 359/275 |
| 4,492,435 A | 1/1985 | Banton et al. ............ 359/291 |
| 4,596,992 A | 6/1986 | Hornbeck ............ 359/573 |
| 4,936,665 A | * 6/1990 | Whitney ............ 359/565 |
| 5,115,344 A | 5/1992 | Jaskie ............ 359/572 |
| 5,311,360 A | 5/1994 | Bloom et al. ............ 359/572 |
| 5,459,610 A | 10/1995 | Bloom et al. ............ 359/292 |
| 5,661,593 A | 8/1997 | Engle ............ 359/292 |
| 5,677,783 A | 10/1997 | Bloom et al. ............ 359/224 |
| 5,757,536 A | 5/1998 | Ricco et al. ............ 359/573 |
| 5,808,797 A | 9/1998 | Bloom et al. ............ 359/572 |
| 5,949,570 A | * 7/1999 | Shiono et al. ............ 359/224 |
| 6,172,796 B1 | 1/2001 | Kowarz et al. ............ 359/290 |

* cited by examiner

Primary Examiner—Audrey Chang
Assistant Examiner—Jennifer Winstedt
(74) Attorney, Agent, or Firm—Thomas H. Close; Stephen H. Shaw

(57) ABSTRACT

A mechanical grating device for improving the diffraction efficiency. The mechanical grating device is built on a base having a surface. Above the base a spacer layer, having an upper surface, is provided, and a longitudinal channel is formed in said spacer layer, said channel having a first and second opposing side wall and a bottom. A plurality of spaced apart deformable ribbon elements are disposed parallel to each other. The deformable elements are organized in groups of N elements wherein N is greater than 2. When the device is actuated each of said groups forms a pattern of discrete levels wherein the pattern has n levels wherein n is greater than 2.

21 Claims, 7 Drawing Sheets

MULTILEVEL MECHANICAL GRATING DEVICE

FIELD OF THE INVENTION

This invention relates to the field of modulation of an incident light beam by the use of a mechanical grating device. More particularly, this invention discloses a multilevel mechanical grating device which has a significant improvement in the output of the diffracted light beam by approximating a continuous blaze grating with m discrete levels.

BACKGROUND OF THE INVENTION

Electro-mechanical spatial light modulators have been designed for a variety of applications, including image processing, display, optical computing and printing, Optical beam processing for printing with deformable mirrors has been described by L. J. Hornbeck; see U.S. Pat. No. 4,596,992, issued Jun. 24, 1986, entitled "Linear Spatial Light Modulator and Printer". A device for optical beam modulation using cantilever mechanical beams has also been disclosed; see U.S. Pat. No. 4,492,435, issued Jan. 8, 1995 to Banton et al., entitled "Multiple Array Full Width Electro-mechanical Modulator," and U.S. Pat. No. 5,661,593, issued Aug. 26, 1997, to C. D. Engle entitled "Linear Electrostatic Modulator". Other applications of electromechanical gratings include wavelength division multiplexing and spectrometers; see U.S. Pat. No. 5,757,536, issued May 26, 1998, to Ricco et al., entitled "Electrically-Programmable Diffraction Grating".

Electro-mechanical gratings are well known in the patent literature; see U.S. Pat. No. 4,011,009, issued Mar. 8, 1977 to Lama et al., entitled "Reflection Diffraction Grating Having a Controllable Blaze Angle", and U.S. Pat. No. 5,115,344, issued May 19, 1992 to J. E. Jaskie, entitled "Tunable Diffraction Grating". More recently, Bloom et al. described an apparatus and method of fabrication for a device for optical beam modulation, known to one skilled in the art as a grating-light valve (GLV): see U.S. Pat. No. 5,311,360, issued May 10, 1994, entitled "Method and Apparatus for Modulating a Light Beam". This device was later described by Bloom et al. with changes in the structure that included: 1) patterned raised areas beneath the ribbons to minimize contact area to obviate stiction between the ribbon and substrate; 2) an alternative device design in which the spacing between ribbons was decreased and alternate ribbons were actuated to produce good contrast; 3) solid supports to fix alternate ribbons and 4) an alternative device design that produced a blazed grating by rotation of suspended surfaces; see U.S. Pat. No. 5,459,610, iggued Oct. 17, 1995, to Bloom et al., entitled "Deformable Grating Apparatus for Modulating a Light Beam and Including Means for Obviating Stiction Between Grating Elements and Underlying Substrate," and U.S. Pat. No. 5,808,797, issued Sep. 15, 1998 to Bloom et al., entitled "Method and Apparatus for Modulating a Light Beam." Bloom et al. also proented a method for fabricating the device; see U.S. Pat. No. 5,677,783, issued Oct. 14, 1997, entitled "Method of Making a Deformable Grating Apparatus for Modulating a Light Beam and Including Means for Obviating Stiction Between Grating Elements and Underlying Substrate".

The GLV device can have reflective coatings added to the top surface of the ribbons to improve the diffraction efficiency and lifetime of the GLV device. Preferred methods of fabrication use silicon wafers as the substrate materials requiring the device to operate in reflection for the wavelengths of interest. An increase in reflectivity ig important to reduce damage of the top surface of the ribbons and avoid mechanical effects that might be attributed to a significant increase in the temperature of the device due to light absorption.

For GLV devices, the positions and heights of the ribbons have been symmetric in design. One drawback to this design is an inability to isolate the optical intensity into a single optical beam. This relatively poor optical efficiency is primarily due to the symmetry of the actuated device, which produces pairs of equal intensity optical beams. Each period of the improved grating must include more than two ribbons and create an asymmetric pattern of the ribbon heights. By creating an asymmetric pattern for the heights of the ribbons, the intensity distribution of the diffracted optical beams is asymmetric and can produce a primary beam with a higher optical intensity. Furthermore, by adjusting the asymmetry of the pattern of ribbon positions and heights, the intensity distribution of the diffracted optical beams can be altered. In this way, the device can be used to switch between various diffracted optical beams.

SUMMARY OF THE INVENTION

It is an object of the present invention to provide a mechanical grating device wherein the diffraction efficiency of a blazed grating is accomplished.

The object is achieved by a mechanical grating device comprising:
- a base having a surface;
- a spacer layer having an upper surface, is provided above the base, and a longitudinal channel is formed in said spacer layer, said channel having a first and second opposing guide wall and a bottom;
- a plurality of spaced apart deformable ribbon elements disposed parallel to each other and spanning the channel, said deformable ribbon elements defining a top and a bottom surface and are filed to the upper surface of the spacer layer on each side of the channel, said deformable elements are organized in groups of N elements wherein N is greater than 2; and
- each of said groups forms a pattern of discrete levels in an actuated state wherein the pattern has n levels wherein n is greater than 2.

It is a further object of the present invention to provide an electro-mechanical grating device wherein the diffraction efficiency of a blazed grating is accomplished.

The object is achieved by an electro-mechanical grating device comprising:
- a base having a surface;
- a spacer layer, having an upper surface, is provided above the base, and a longitudinal channel is formed in said spacer layer, said channel having a first and second opposing side wall and a bottoms
- a first conductive layer being provided below the bottom of the channel;
- a plurality of spaced apart deformable ribbon elements disposed parallel to each other and spanning the channel, said deformable ribbon elements defining a top and a bottom surface and are fixed to the upper surface of the spacer layer on each side of the channel, said deformable elements are organized in groups of N elements wherein N is greater than 2;
- each of said groups forms a pattern of discrete levels in an actuated state wherein the pattern has n levels wherein n is greater than 2; and a second conductive layer being part of each actuable ribbon element.

An advantage of the mechanical grating device of the invention is that the position of the ribbons across the area of the substrate and the periodic sequence of the ribbon heights can be used to improve the diffraction efficiency of the optical beam. This invention presents a periodic sequence of ribbon heights that resembles a blazed grating with discrete levels and is predicted to significantly increase the optical diffraction efficiency. The multi-level mechanical grating device can be fabricated using methods that are compatible with the microelectronics industry. The device is more reliable and more appropriate for printing applications than other blazed mechanical and/or electro-mechanical gratings in the patent literature. Further advantageous effects of the present invention are disclosed in the dependent claims.

BRIEF DESCRIPTION OF THE DRAWINGS

The subject matter of the invention is described with reference to the embodiments shown in the drawings.

DETAILED DESCRIPTION OF THE INVENTION

Figure 1:
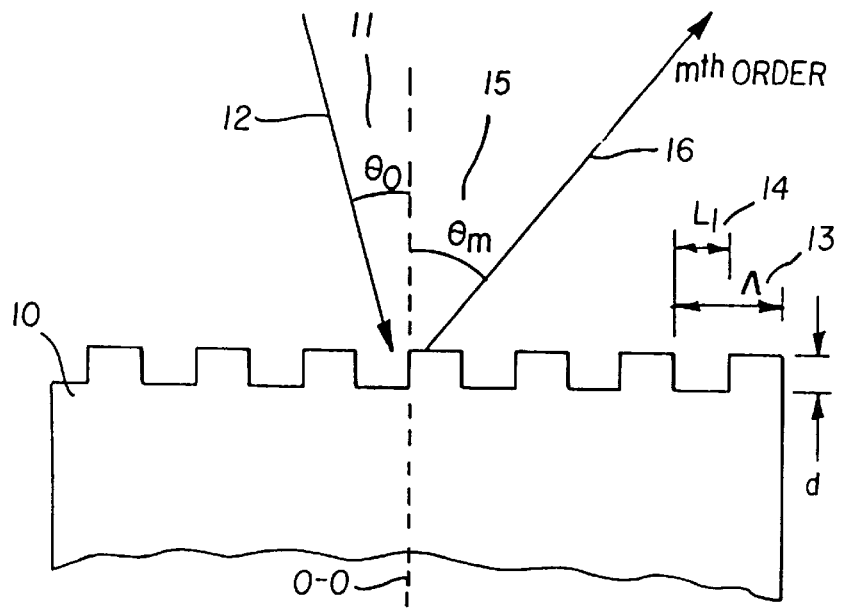
FIG. 1 is an illustration of diffraction from a binary reflective grating.

Periodic corrugations on optical surfaces (i.e. diffraction gratings) are well known to perturb the directionality of incident light. Collimated light incident in air upon a grating is diffracted into a number of different orders, as described by the grating equation, $$\sin\theta_m = \sin\theta_0 + \frac{m\lambda}{\Lambda}, \quad (1)$$

where $\lambda$ is the wavelength of the light and m is an integer denoting the diffracted order. FIG. 1 illustrates a reflective grating 10 having an optical beam 12 incident on the grating 10 at an angled $\theta_0$ 11 with respect to an orthogonal axis O—O of the reflective grating 10. The grating surface is defined to have a period $\Lambda$ 13, which defines the angles of diffraction according to the relation presented in Equation 1. A diffracted beam 16 corresponding to diffraction order m exits the grating 10 at an angle $\theta_m$ 15.

The diffraction grating 10 pictured in FIG. 1 is a binary grating where the grating profile is a square wave. The duty cycle is defined as the ratio of the width of the groove $L_1$ 14 to the grating period $\Lambda$ 13. A binary phase grating will have the maximum diffraction efficiency when the duty cycle is equal to 0.5 and R, the reflectivity, is equal to 1.0.

For uniform reflectivity and 0.5 duty cycle, the relation presented in Equation 2 is appropriate for the calculation of the theoretical diffraction efficiency, within the accuracy of scalar diffraction theory.

$$\eta_m = R\cos^2\left(\frac{\pi}{\lambda}(q_m d - m\lambda/2)\right)\frac{\sin^2(m\pi/2)}{(m\pi/2)^2}, \quad (2)$$

where $q_m$ is a geometrical factor, $$q_m = \cos\theta_0 + \cos\theta_m \quad (3)$$

$$= 1 + \sqrt{1 - (m\lambda/\Lambda)^2} \text{ for normal incidence } (\theta_0 = 0).$$

For normally incident illumination, the maximum efficiency in the first (m=1) order occurs when the grating depth d=$\lambda$/4. Such a grating has equal diffraction efficiencies into the +1 and −1 orders of approximately 40% for the gratings of interest ($\lambda/\Lambda \leq 0.5$), while the remaining light is diffracted into higher odd orders (i.e. ±3, ±5, etc.).

Figure 2:
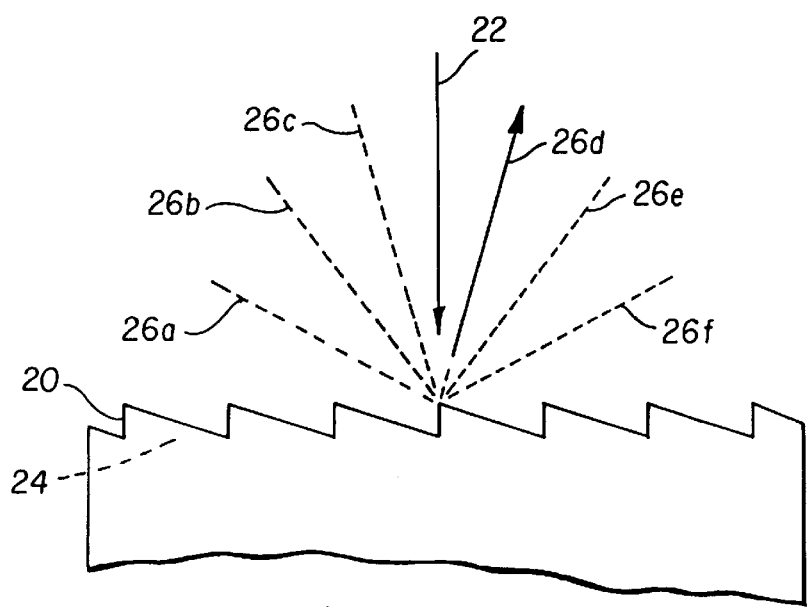
FIG. 2 is an illustration of diffraction from a blazed reflective grating.

For applications requiring a high optical throughput, the grating is desired to diffract with a very high efficiency into a single optical beam. It is well known to one skilled in the art that this is best accomplished by shaping the grating profile with a blaze, see C. Palmer, ed., *Diffraction Grating Handbook*, 2$^{nd}$ ed., (Milton Roy Instruments, Rochester, N.Y., 1993). FIG. 2 illustrates the continuous blazed grating profile 20 with a beam 22 incident on the plane of the grating surface 24 to produce diffracted beams 26a, 26b, 26c, 26d, 26e, 26f associated with the non-zero orders of diffraction. By proper design of the grating profile the intensity of the beam in the +1 diffracted order 26d is maximized.

Figure 3:
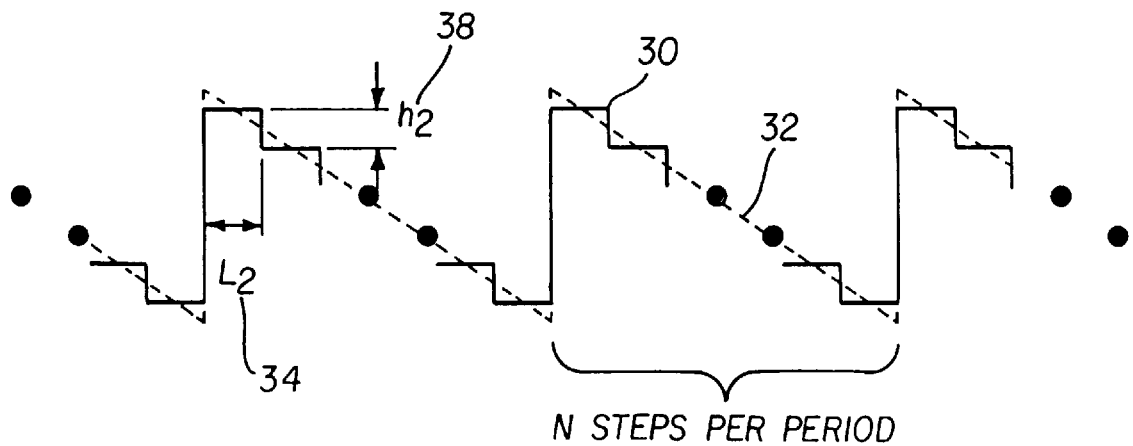
FIG. 3 is an illustration of a multi-level diffraction grating to approximate a blazed grating.

The preferred methods of fabricating a grating device do not allow the grating profile illustrated in FIG. 2. FIG. 3 is an illustration of the grating profile that would be produced using microelectronic fabrication techniques to approximate the blaze with discrete steps wherein each step represents a separate level. The grating profile 30 is a multilevel step grating that approximates a continuous blazed grating profile 32 having a width $L_2$ 34 and a height of separation $h_2$ 38. Equation 4 is the scalar diffraction theory expression for the efficiency of diffraction. The number of discrete steps N within this expression defines the grating profile 30. For the GLV device, the value of the integer is selected based on the period of the grating profile and the selected width of the ribbon $L_2$ 34. The value of $L_2$ 34 is chosen to achieve the required diffraction efficiency, but is limited to a minimum by the available fabrication methods. The value for the height $h_2$ 38 is optimized for maximum intensity in the +1 diffracted optical beam according to the expression $$h_2 = \lambda/2N + p\frac{\lambda}{2}$$

where p is 0 or a positive integer.

The diffraction efficiency $\eta_m$ into the $m^{th}$ order for a grating with N steps tuned to the +1 order is predicted via scalar theory to be, $$\eta_m = \frac{R}{N^2} \left| \sum_{l=0}^{N-1} e^{i\frac{\pi l}{N}(q_m - 2m)} \right|^2 \frac{\sin^2(m\pi/N)}{(m\pi/N)^2}. \quad (4)$$

As an example of using these relationships, Table 1 shows the diffraction efficiency into the −3 through +3 orders for gratings with differing discrete steps N and R (reflectivity) equal to 1.0. With the addition of a third discrete step, the grating profile becomes asymmetric and the intensity in the +1 diffracted beams 26d is increased by 70% over the power obtained for a grating profile having a square wave profile, N=2. The improvement in diffraction efficiency increases with an increasing number of step levels N.

TABLE 1

| N | $\eta_{-3}$ | $\eta_{-2}$ | $\eta_{-1}$ | $\eta_0$ | $\eta_1$ | $\eta_2$ | $\eta_3$ |
|---|---|---|---|---|---|---|---|
| 2 | 0.045 | 0 | 0.405 | 0 | 0.405 | 0 | 0.045 |
| 3 | 0 | 0.171 | 0 | 0 | 0.684 | 0 | 0 |
| 4 | 0.090 | 0 | 0 | 0 | 0.811 | 0 | 0 |
| 5 | 0 | 0 | 0 | 0 | 0.875 | 0 | 0 |

For the application of the device described here to printing by photosensitive media or thermal sensitive methods, the efficiency should be maximized to allow faster rates of printing while reducing the power requirements of the optical sources providing the incident illumination. For display and other applications, increased efficiency is also advantageous. Ideally, the continuous blaze grating profile could be used to maximize the efficiency of a single diffracted order. Because of the fabrication methods chosen, the alternative of using multiple step levels is desirable. FIG. 3 illustrates a grating profile that can be produced using the standard fabrication processes of microelectronic devices.

Figure 4:
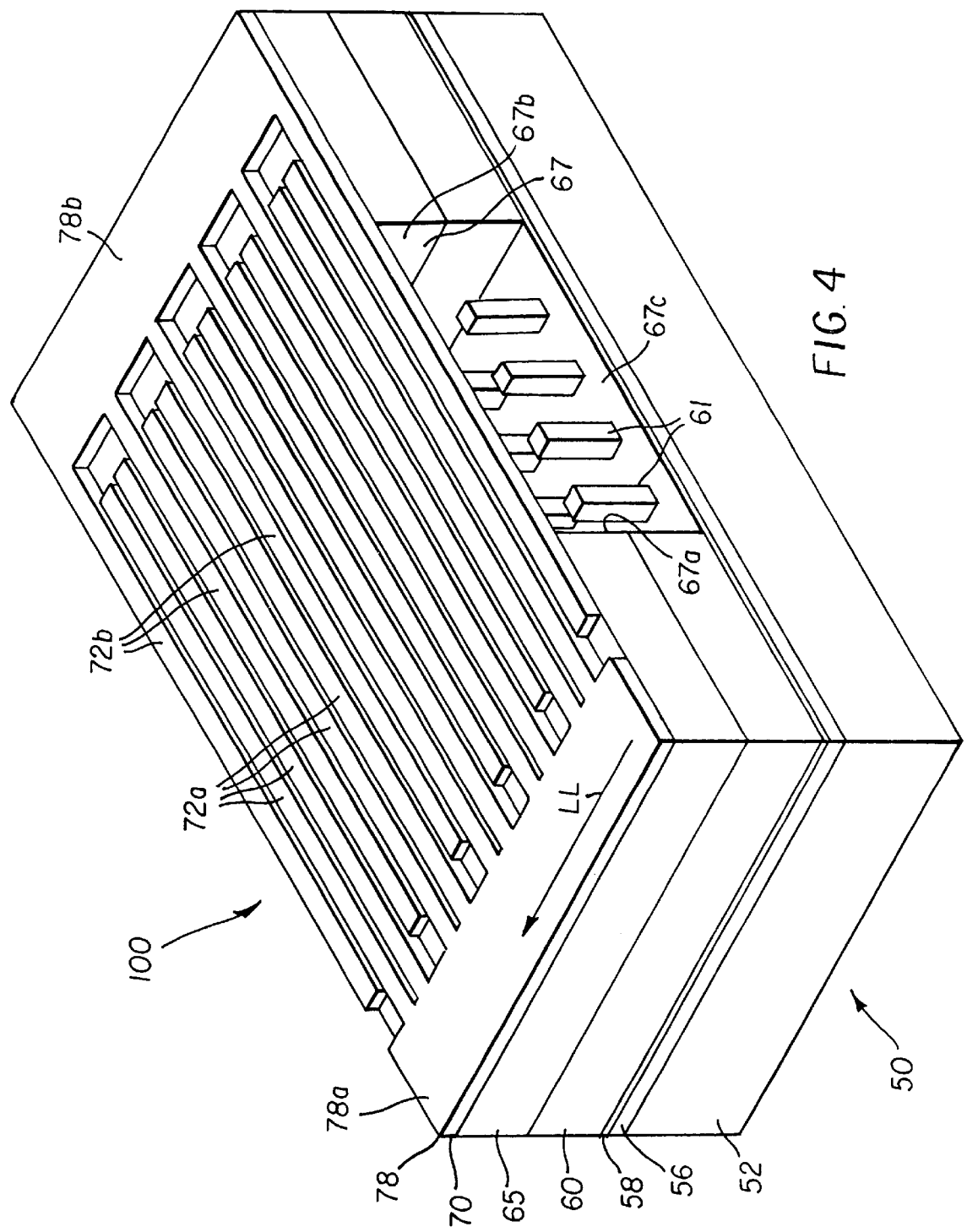
FIG. 4 is a perspective, partially cut-away view of the multilevel mechanical grating device of the present invention.

Referring now to FIG. 4 which illustrates a perspective, partially cut-away view of the multilevel mechanical grating device 100 of the present invention. The multilevel mechanical grating device 100 disclosed therein can from at least three different levels. The mechanically deformable structures of the device 100 are formed on top of a base 50. The present embodiment as shown in FIG. 4 discloses a device 100 that can be operated by the application of an electrostatic force. Because the actuation force of the multilevel mechanical grating device 100 is electrostatic, the base 50 comprises several layers of different materials. The base 50 comprises a substrate 52 chosen from the materials glass and silicon, which is covered by a bottom conductive layer 56. In this embodiment the thin bottom conductive layer 56 is necessary since it acts as an electrode for applying the voltage to actuate the mechanical grating device 100. The thin bottom conductive layer 56 is covered by a protective layer 58. The bottom conductive layer 56 is selected from the group consisting of aluminum, titanium, gold, silver, tungsten, silicon alloys and indium tin oxide. Above the protective layer 58 a standoff layer 60 is formed which is followed by a spacer layer 65. On top of the spacer layer 65, a ribbon layer 70 is formed which is covered by a reflective layer or layers 78. The thickness and tensile stress of the ribbon layer 70 are chosen to optimize performance by influencing the electrostatic or mechanic force required for actuation and the returning force, which affects the speed, resonance frequency, and voltage requirements of the multilevel mechanical grating device 100. In the present embodiment the reflective layer 78 also has to include a conductor in order to provide electrodes for the actuation of the multilevel mechanical grating device 100. The electrodes are patterned from the reflective and conductive layer 78.

The spacer layer 65 has a longitudinal channel 67 formed therein that extends along the longitudinal direction L—L of the multilevel mechanical gating device 100. The longitudinal channel 67 comprises a first and second side wall 67a and 67b and a bottom 67c. The channel 67 ig open on top and covered by a first and second set of deformable ribbon elements 72a and 72b. Each deformable ribbon element 72a and 72b spans the channel 67 and is secured to the surface of the spacer layer 65 on either side of the channel 67. The bottom 67c of the channel 67 is covered by the protective layer 58. As mentioned above, the ribbon layer 70 is covered by the reflective layer 78. The reflective layer 78 (conductive) is patterned such that there are first and second conducting regions 78a and 78b, which form comb-like structures arranged on the surface of the multilevel mechanical grating device 100 in an interdigitated manner. The first and second conductive region 78a and 78b are mechanically and electrically isolated from one another. According to the pattern of the reflective layer 78, the ribbon layer 70 is patterned to form the first and the second set of deformable ribbon elements 72a and 72b spanning the channel 67. The deformable ribbon elements 72a and 72b are grouped according to the longitudinal direction L—L of the channel 67. In the case of the three level mechanical grating device (embodiment as disclosed in FIG. 4) three deformable ribbon elements belong to one group. Each group comprises one deformable ribbon element from the second set 72b and two deformable ribbon elements from the first set 72a.

Figure 7:
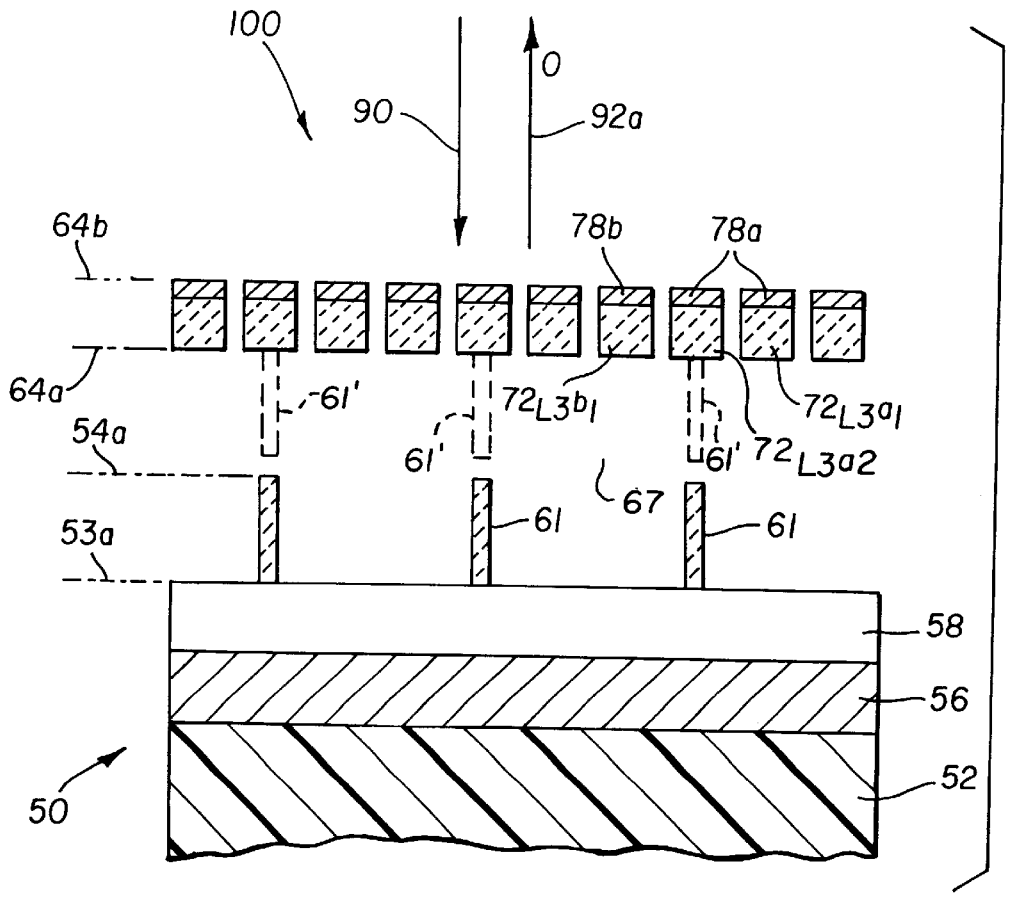
FIG. 7 is a cross-sectional view along plane 7—7 indicated in FIG. 5 of the three level mechanical grating device wherein no force is applied to the deformable ribbons.

In the embodiment shown in FIG. 4, a plurality of standoffs 61 is positioned on the bottom 67c of the channel 67. The standoffs 61 are patterned from the standoff layer such that a group of standoffs 61 is associated with the deformable ribbon elements 72a and 72b of each group. In the embodiment shown here, the group of standoffs 61 is associated with the second ribbon element $72_{L3}a_2$ of each group (valid for three ribbon elements per group). As shown in FIG. 7, each group comprises a first, second and third ribbon element $72_{L3}a$, $72_{L3}a_2$, and $72_{L3}b_1$. The standoffs 61 may also be patterned in the form of a single bar. Alternatively, the standoffs 61 may be formed on the bottom surfaces of the ribbon elements 72.

Figure 5:
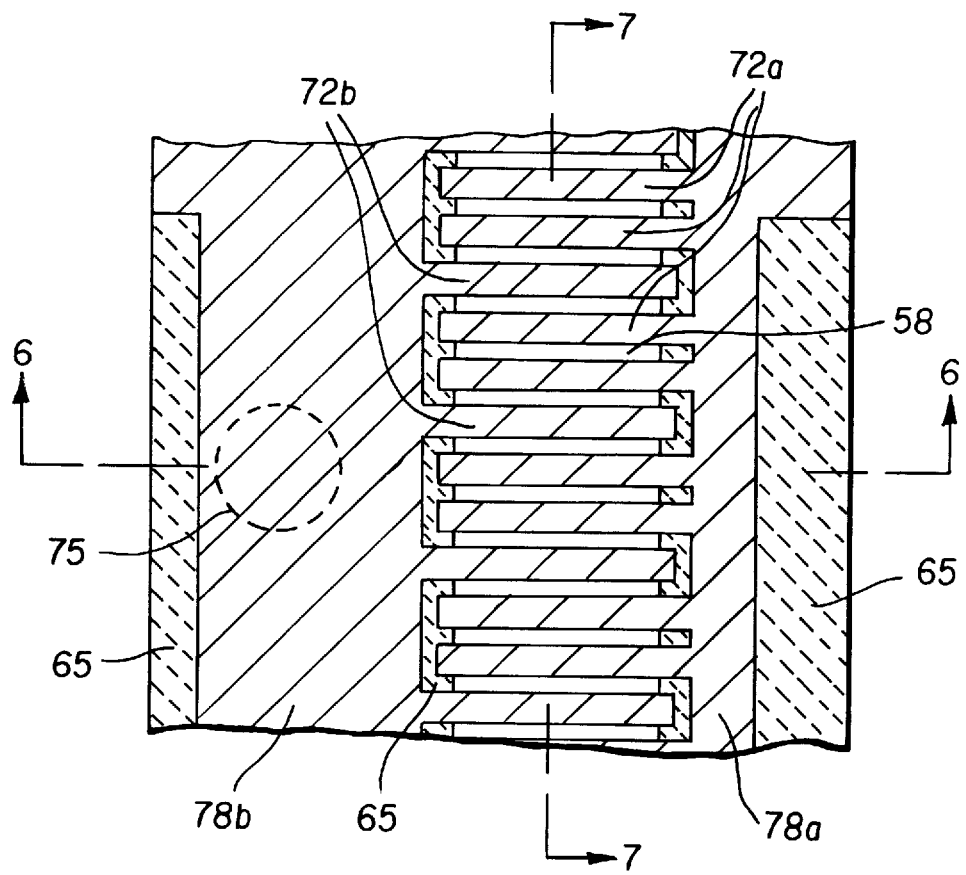
FIG. 5 is a top view of the multilevel mechanical grating device of the present invention.
Figure 6:
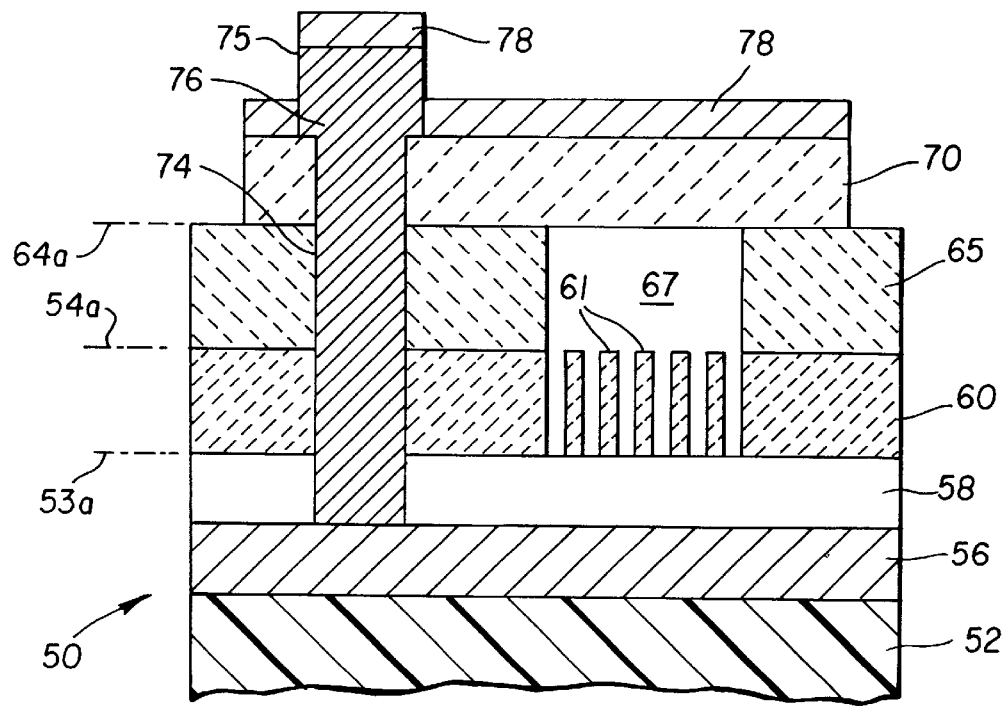
FIG. 6 a cross-sectional view along plane 6—6 indicated in FIG. 5 to illustrate the layered structure of one embodiment of the invention.

A top view of the multilevel mechanical grating device 100 with three levels is illustrated in FIG. 5, which also shows two planes perpendicular to the view illustrated. View Plane 6—6 is a side view of the multilevel mechanical grating device 100 and depicts the view shown in FIG. 6. View Plane 7—7 is a side view of the device and depicts the view shown in FIG. 7. Note that a device with four or more levels (four or more deformable ribbon elements per group) is a straightforward extension of the principles illustrated in FIGS. 5, 6 and 7.

The mechanical grating device 100 as shown in FIG. 5, is a device which can be actuated by the application of an electrostatic force. It is clear that a person skilled in the art can imagine other ways for actuating the grating device, for example thermal actuation, piezoelectric actuation or any combination. In the embodiment shown in FIG. 5, a first and a second electrically conducting region 78a and 78b are formed on the surface of the mechanical grating device 100. The first and the second electrically conducting region 78a and 78b are electrically and mechanically isolated from each other to allow the application of different voltages to the first and second sets of deformable ribbon elements 72a and 72b. The first conducting region 78a applies the voltage to the first set of deformable ribbon elements 72a and the second conducting region 78b provides the voltage to the second set of deformable ribbon elements 72b. The second conducting region 78b is in contact with the bottom conductive layer 56 (see FIG. 6) designated at the base 50 through at least one etched opening 74 filled with the thick conducting layer 76. For operation of the device, the electrostatic force is produced by a voltage difference between the bottom conductive layer 56 and the conducting layer 78 atop the ribbon layer 70. Ideally the conducting layer 78 is highly reflective to maximize the optical diffraction efficiency when operating the device. The connection with the bottom conductive layer 56 is carried out by an interconnect 75. The thin bottom conductive layer 56 is formed below the bottom 67c of the channel 67. From the view of FIG. 5, regions of the spacer layer 65 and protective layer 58 are visible because of patterning of first and second conductive region 78a and 78b to achieve electrical and mechanical isolation of the deformable ribbon elements 72a and 72b.

Figure 8:
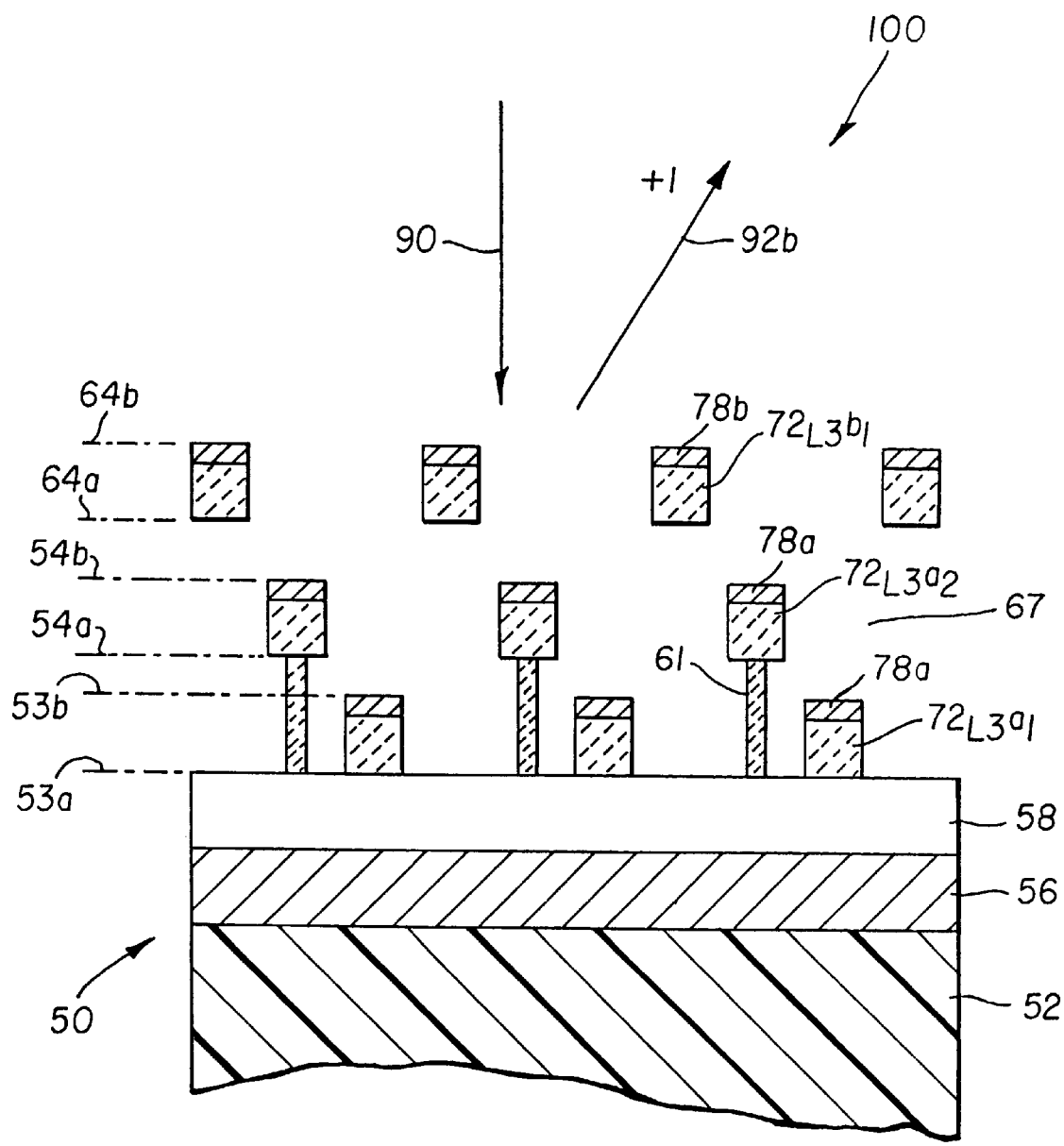
FIG. 8 is a cross-sectional view along plane 7—7 indicated in FIG. 5 of the three level mechanical grating device wherein force is applied to the deformable ribbons.

The device presented here is a GLV that incorporates multiple levels, which means more than two, to discretely approximate a blazed grating. FIGS. 7 and 8 illustrate this concept with three levels, and FIGS. 9 and 10 illustrate the concept with four levels.

In FIG. 7, the surface 53a of the substrate is shown with pedestals or lines as standoffs 61 designed with specific heights as defined by the relationship between the height $h_2$ 38 and the number of ribbons N per group. For this case, the value of N is three for the group which represents one period $\Lambda$. The first ribbon element of each group is designated $72_{L3}a_1$, the second ribbon element of each group is designated $72_{L3}a_2$ and the third ribbon element of each group is designated $72_{L3}b_1$. The first and second ribbon element $72_{L3}a_1$ and $72_{L3}a_2$ of each group are contacted by the first conductive region 78a or, in other words, the first and second ribbon elements $72_{L3}a_1$ and $72_{L3}a_2$ of each group belong to the first set of deformable ribbon elements 72a. The third ribbon element $72_{L3}b_1$ of each group is contacted by the second conductive region 78b or the third ribbon element $72_{L3}b_1$ of each group belongs to the second set of deformable ribbon elements 72b. The height of the intermediate level is defined by standoff 61 which is associated with the second ribbon element $72_{L3}a_2$ of each group. In the unactuated state (no applied force) all the ribbon elements 72a and 72b are coplanar, defining a first top level 64b and a first bottom level 64a. The unactuated multilevel mechanical grating device 100 acts like a mirror and an incident light beam 90, having a wave-length $\lambda$, is reflected into the $0^{th}$ order. The reflected light beam in the $0^{th}$ order is designated 92a. In the actuated state (FIG. 8) the deformable ribbon elements 72a of the first set are subjected to a deformation which draws the ribbon elements into the channel 67. The ribbon elements 72b of the second set are not subjected to any deformation. Therefore every third ribbon element $72_{L3}b_1$ of each group remains in the unactuated state thereby defining the first top level 64b and the first bottom level 64a. The second ribbon element of each group abuts against the standoff 61, thereby defining a first intermediate top level 54b. The first element $72_{L3}a_1$ of each group is moved to the bottom of the channel 67, defined by surface 53a, thereby defining a bottom top level 53b. Each top level 64b, 54b and 53b is spaced by $\lambda/2N$ above the surface 53a to maximize the efficiency of diffraction into the ±1 order. The diffracted beam is designated 92b. The alternative location of the standoffs 61 on the bottom surfaces of the ribbon elements is shown in FIG. 7 by dotted outlines labeled 61'.

Although the ribbons in each group are actuated to different depths, each does not have to be independently addressed by the driver circuitry. The presence of standoffs to define the height 54a enables the device to operate as designed with all moving ribbons receiving the same voltage and initial electrostatic force. Thus, only two independent voltage levels are required to operate a device with improved efficiency, ground voltage and operating voltage. This is equivalent to the requirement of the device designs of prior art.

Figure 9:
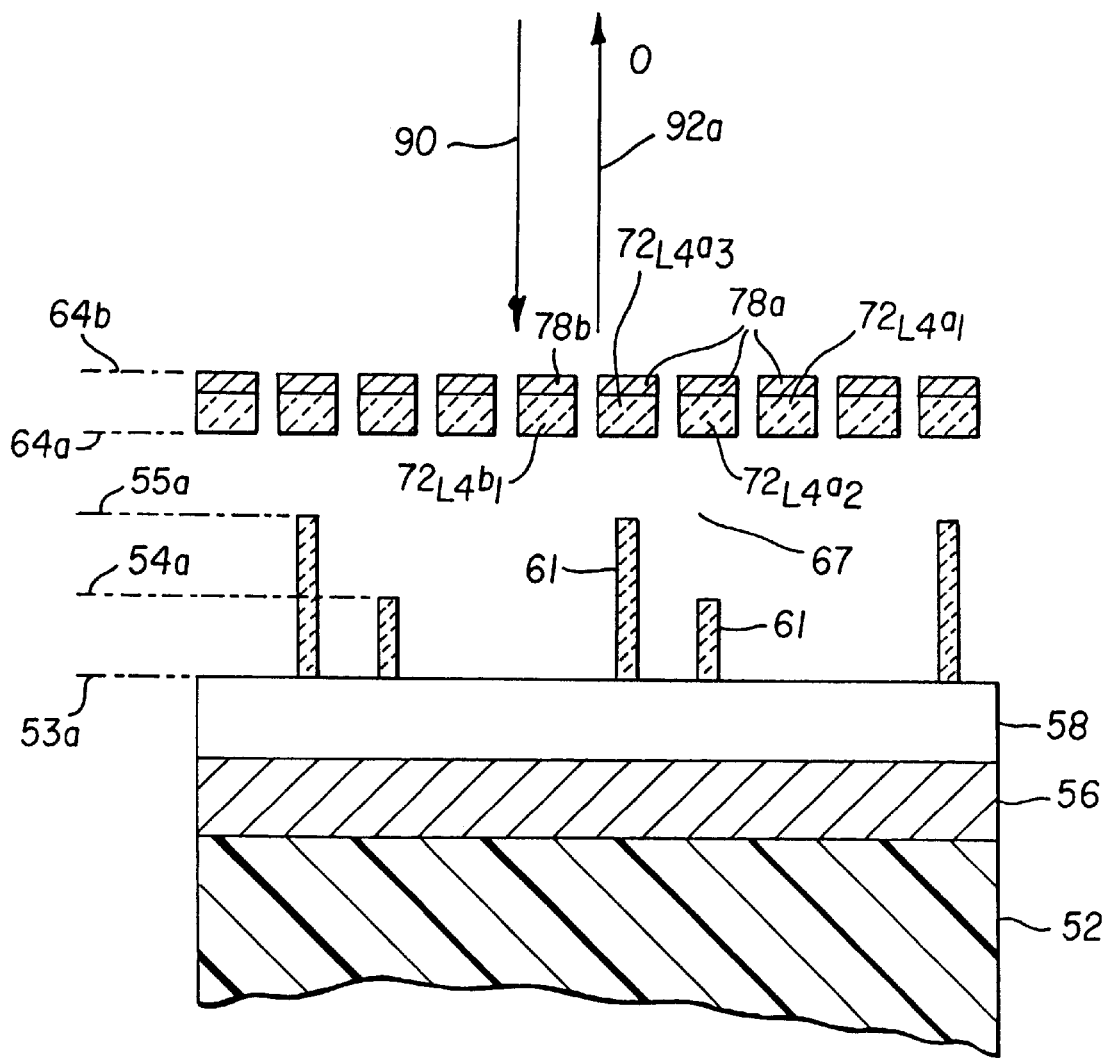
FIG. 9 is a cross-sectional view along plane 7—7 indicated in FIG. 5 of the four level mechanical grating device wherein no force is applied to the deformable ribbons.
Figure 10:
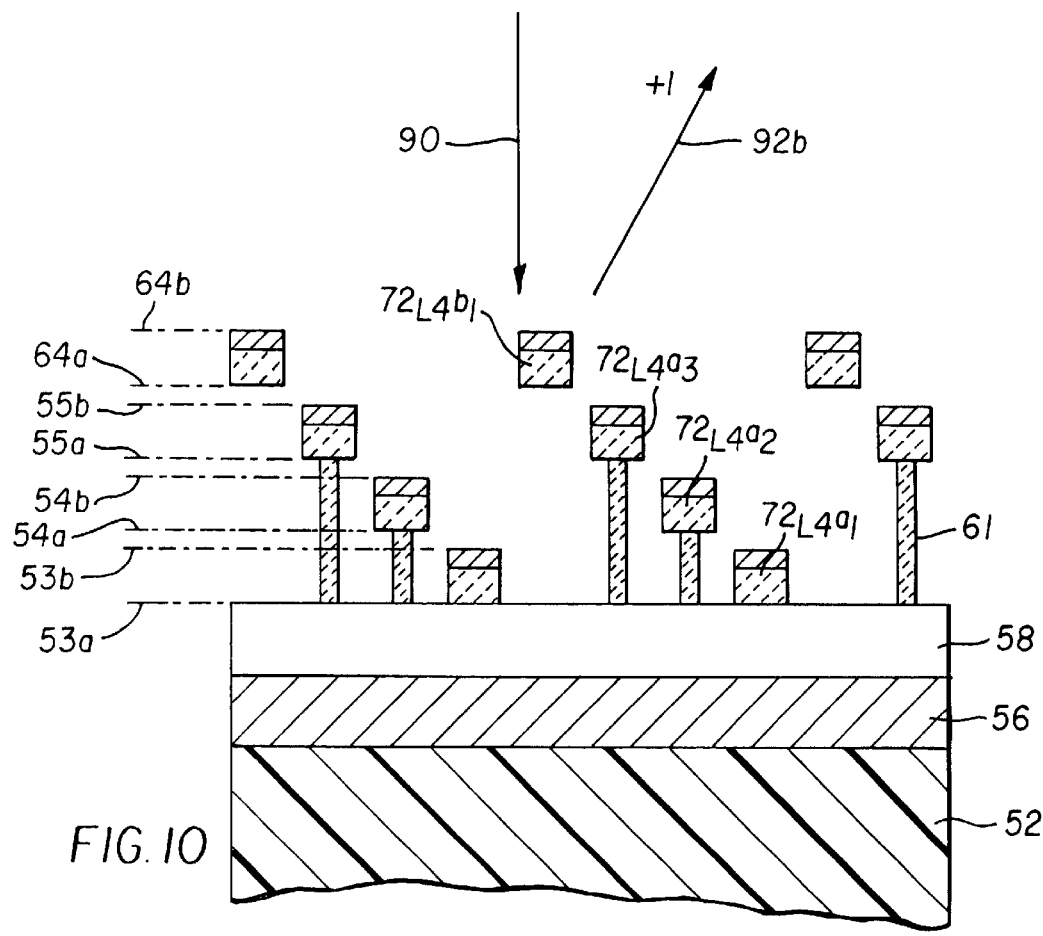
FIG. 10 is a cross-sectional view along plane 7—7 indicated in FIG. 5 of the four level mechanical grating device wherein force is applied to the deformable ribbons.

In FIGS. 9 and 10, in which N=4, the lower standoff height 61 is $\lambda/8$ and the upper standoff height 62 is $\lambda/4$. The total depth of the channel should be $(1-1/N)\lambda/2$. For this case, the value of N is four for a group which represents one period $\Lambda$. The first ribbon element of each group is designated $72_{L4}a_1$, the second ribbon element of each group is designated $72_{L4}a_2$, the third ribbon element of each group is designated $72_{L4}a_3$ and the fourth ribbon element of each group is designated $72_{L4}b_1$. The heights of the intermediate levels are defined by standoffs 61 which are associated with the second and third ribbon element $72_{L4}a_2$ and $72_{L4}a_3$ of each group. The standoff 61 associated with the second ribbon element $72_{L4}a_2$ defines a surface 54a. The standoff 61 associated with the third ribbon element $72a_3$ defines a surface 55a. In the unactuated state (no applied force) all the ribbon elements 72a and 72b are coplanar, defining a first top level 64b and a first bottom level 64a. The unactuated multilevel mechanical grating device 100 acts like a mirror and an incident light beam 90, having a wavelength $\lambda$, is reflected into the $0^{th}$ order. The reflected light beam in the $0^{th}$ order is designated 92a. In the actuated state (FIG. 10) the deformable ribbon elements 72a of the first set are subjected to a deformation which draws the ribbon elements into the channel 67. The ribbon elements 72b of the second set are not subjected to any deformation. Therefore every forth ribbon element $72_{L4}b_1$ of each group remains in the unactuated state thereby defining the first top level 64b and the first bottom level 64a. The third ribbon element $72_{L4}a_3$ of each group abuts against the standoff 61, defining the surface 55a, thereby defining a first intermediate top level 55b. The second ribbon element $72_{L4}a_2$ of each group abuts against the standoff 61, defining the surface 54a, thereby defining a second intermediate top level 55b. The first element $72_{L4}a_1$ of each group is moved to the bottom of the channel 67, defined by surface 53a, thereby defining a bottom top level 53b. Each top level 64b, 55b, 54b and 53b is spaced by $\lambda/2N$ above the surface 53a to maximize the efficiency of diffraction into the +1 order. The diffracted beam is designated 92b.

Figure 11:
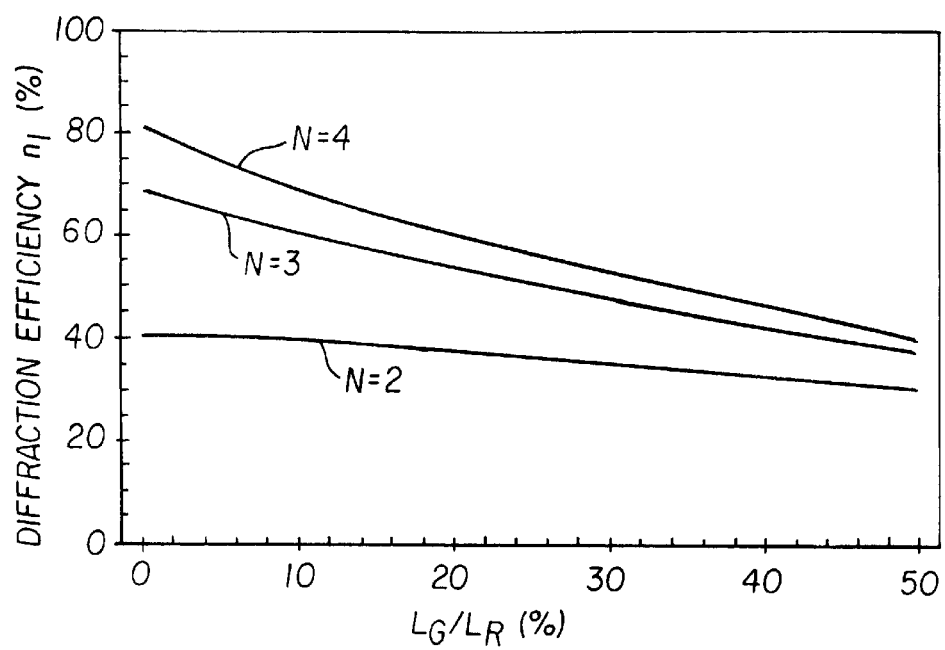
FIG. 11 shows the effect of gap width on diffraction efficiency of a two, three and four-level grating light valve.

As discussed previously, the optical efficiency of the device can theoretically be increased by up to 70% for a 3-level grating or 102% for a 4-level grating, assuming ideal reflectors and ignoring effects from inter-ribbon gaps. Note that, while more levels yields higher diffraction efficiencies in the ideal grating, the presence of gaps between ribbons degrades the performance of 3- and 4-level gratings relative to that of 2-level gratings. Furthermore, the additional levels will increase the number of processing steps required to create the standoffs 61. FIG. 11 shows a plot of the theoretical diffraction efficiency of the $1^{st}$-order beam as a function of the percent ratio of gap width $L_G$ to the ribbon width $L_R$, within the accuracy of scalar diffraction theory. In practice, with an optimized device, the ratio $L_G/L_R$ can be between 10% and 30% and the corresponding 3- and 4-level gratings still provide a significant improvement in diffraction efficiency. Thus, the ideal number of ribbons per period, N, is probably either three or four, depending on the minimum feasible size of the gaps between the ribbons and the allowed pixel width.

The invention has been described in detail with particular reference to certain preferred embodiments thereof, but it will be understood that variations and modifications can be effected within the spirit and scope of the invention.

PARTS LIST 10 reflective grating
11 angle $\theta_0$
12 optical beam
13 period $\Lambda$
14 width of the groove
15 angle $\theta_m$
16 diffracted beam
20 blazed grating
22 incident beam
24 grating surface
26a to 26f diffracted beams
30 grating profile
32 continuous blazed grating profile
34 width $L_2$
38 a height of separation $h_2$
50 base
50a top surface of base
52 substrate
53 surface of the base
53a surface
53b
54a top surface of standoffs
54b second intermediate top level
55a surface
55b first intermediate top level
56 bottom conductive layer
58 protective layer
60 standoff layer
61 standoff
64a first bottom level
64b first top level
65 spacer layer
66 sacrificial layer
67 channel
67a first side wall of the channel
67b second side wall of the channel
67c bottom of the channel
70 ribbon layer
70a bottom surface of the coplanar ribbon elements
70b top surface of the coplanar ribbon elements
72a first set of deformable ribbon elements
72b second set of deformable ribbon elements
$72_{L3}a_1$ first element of each group of three
$72_{L3}a_2$ second element of each group of three
$72_{L3}b_1$ third element of each group of three
$72_{L4}a_1$ first element of each group of four
$72_{L4}a_2$ second element of each group of four
$72_{L4}a_3$ third element of each group of four
$72_{L4}b_1$ fourth ribbon element of each group of four
74 opening
75 interconnect
76 thick conductor
78a first conducting region
78b second conducting region
92b diffracted beam
100 multilevel mechanical grating device
L longitudinal direction
N number of discrete steps
d grating depth
m order
n number of levels
$\eta_m$ diffraction efficiency
6—6 view plane
7—7 view plane
L—L longitudinal direction of the device
O—O orthogonal axis

What is claimed is:

1. A mechanical grating device comprising:
   a base having a surface;
   a spacer layer, having an upper surface, is provided above the base, and a longitudinal channel is formed in said spacer layer, said channel having a first and second opposing side walls and a bottom;
   a plurality of spaced apart deformable ribbon elements disposed parallel to each other and spanning the channel, said deformable ribbon elements defining a top and a bottom surface and are fixed to the upper surface of the spacer layer on each side of the channel, said deformable ribbon elements are organized in groups of N elements wherein N is greater than 2;
   at least N-2 standoffs provided for each group according to the longitudinal direction of the device, wherein said N-2 standoffs present a periodic sequence of standoff heights forming discrete steps;
   each of said groups forms a pattern of discrete levels in an actuated state wherein the pattern has N levels so as to present a periodic sequence of ribbon heights that resembles a blazed grating; and
   at least N-1 deformable ribbon elements of said groups, in said actuated state, being in mechanical contact with an underlying structure to form said pattern of discrete levels.

2. The mechanical grating device as recited in claim 1 wherein at least N-1 standoffs are provided for each group and said mechanical contact is between said deformable ribbon elements and said standoffs.

3. The mechanical grating device as recited in claim 1 wherein the standoffs are formed on the bottom of the channel.

4. The mechanical grating device as recited in claim 1 wherein the standoffs are formed on the bottom surface of the ribbon elements.

5. The mechanical grating device as recited in claim 1 wherein according to the width of said device each standoff is divided into a plurality of individual elements Of equal height.

6. The mechanical grating device as recited in claim 1 wherein in the actuated state the levels of adjacent ribbon elements in each group are separated by $$\frac{\lambda}{2N} + p\frac{\lambda}{2},$$

wherein $\lambda$ is the wavelength of light; and p is 0 or a positive integer.

7. The mechanical grating device as recited in claim 6 wherein in the actuated state the levels of successive ribbon elements in each group are reduced by a constant amount with respect to the bottom of the channel, and thereby representing a staircase of equal steps.

8. The mechanical grating device as recited in claim 1 wherein said side walls are substantially vertically disposed with respect to the bottom.

9. The mechanical grating device as recited in claim 1 wherein said channel has a constant cross section along the entire length of the device.

10. The mechanical grating device as recited in claim 1 wherein a reflective layer is provided on the top surface of the ribbon elements.

11. An electromechanical grating device comprising:

a base having a surface;

a spacer layer, having an upper surface, is provided above the base, and a longitudinal channel is formed in said spacer layer, said channel having a first and second opposing side walls and a bottom;

a first conductive layer being provided below the bottom of the channel;

a plurality of spaced apart deformable ribbon elements disposed parallel to each other and spanning the channel, said deformable ribbon elements defining a top and a bottom surface and are fixed to the upper surface of the spacer layer on each side of the channel, said deformable elements are organized in groups of N elements wherein N is greater than 2;

at least N-2 standoffs provided for each group according to the longitudinal direction of the device wherein said N-2 standoffs present a periodic sequence of standoff heights forming discrete steps;

each of aid groups forms a pattern of discrete levels in an actuated state wherein the pattern has N levels so as to present a periodic sequence of ribbon heights that resembles a blazed grating;

a second conductive layer being part of each actuable ribbon element; and at least N-1 deformable ribbon elements of said groups, in said actuated state, being in mechanical contact with an underlying structure to form said pattern of discrete levels.

12. The electromechanical grating device as recited in claim 11 wherein at least N-1 standoffs are provided for each group and said mechanical contact is between said deformable ribbon elements and said standoffs.

13. The electro-mechanical grating device as recited in claim 11 wherein the standoffs are formed on the bottom of the channel.

14. The electromechanical grating device as recited in claim 11 wherein the standoffs are formed on the bottom surface of the ribbon elements.

15. The electro-mechanical grating device as recited in claim 11 wherein according to the width of said device each standoff is divided into a plurality of individual elements of equal height.

16. The electro-mechanical grating device as recited in claim 11 wherein in the actuated state the levels of adjacent ribbon elements in each group are separated by $$\frac{\lambda}{2N} + p\frac{\lambda}{2},$$

wherein $\lambda$ is the wavelength of light; and p is 0 or a positive integer.

17. The electro-mechanical grating device as recited in claim 16 wherein in the actuated state the levels of successive ribbon elements in each group with respect to the bottom of the channel are reduced by a constant amount, thereby representing a staircase of equal steps.

18. The electro-mechanical grating device as recited in claim 11 wherein said side walls are substantially vertically disposed with respect to the bottom.

19. The electro-mechanical grating device as recited in claim 11 wherein said channel has a constant cross section along the entire length of the device.

20. The electro-mechanical grating device as recited in claim 11 wherein a reflective layer is provided on the top surface of the ribbon elements.

21. The electro-mechanical grating device as recited in claim 11 comprises a driving means for applying a voltage between the first and the second conductive layer to actuate the ribbon elements.

* * * * *